US007670577B2

(12) United States Patent
Rohr et al.

(10) Patent No.: US 7,670,577 B2
(45) Date of Patent: Mar. 2, 2010

(54) METHOD FOR OPERATING A NITROGEN OXIDE STORAGE CATALYST IN A DIESEL ENGINE

(75) Inventors: Friedemann Rohr, Hanau (DE); Lutz Marc Ruwisch, Darmstadt (DE); Markus Koegel, Seligenstadt (DE); Juliane Kluge, Munich (DE); Ulrich Goebel, Hattersheim (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 17 days.

(21) Appl. No.: 12/090,936

(22) PCT Filed: Oct. 19, 2006

(86) PCT No.: PCT/EP2006/010109

§ 371 (c)(1),
(2), (4) Date: Sep. 29, 2008

(87) PCT Pub. No.: WO2007/045482

PCT Pub. Date: Apr. 26, 2007

(65) Prior Publication Data

US 2009/0297415 A1    Dec. 3, 2009

(30) Foreign Application Priority Data

Oct. 21, 2005    (DE)    .................. 10 2005 050 517

(51) Int. Cl.
*B01D 53/56* (2006.01)
*B01D 53/94* (2006.01)
(52) U.S. Cl. .................. 423/213.2; 423/239.1; 60/295; 60/299; 60/301
(58) Field of Classification Search .............. 423/213.2, 423/239.1; 60/295, 299, 301
See application file for complete search history.

(56) References Cited

U.S. PATENT DOCUMENTS

| 6,691,509 | B2 | 2/2004 | Hoffman et al. | |
| 7,351,677 | B2 * | 4/2008 | Rohr et al. | 502/38 |
| 2004/0055285 | A1 * | 3/2004 | Rohr et al. | 60/295 |
| 2007/0130920 | A1 * | 6/2007 | Nam | 60/286 |
| 2007/0234710 | A1 * | 10/2007 | Franz | 60/295 |

FOREIGN PATENT DOCUMENTS

DE    19923498 A1    11/2000

(Continued)

OTHER PUBLICATIONS

International Search Report (PCT/EP2006/010109), dated Feb. 8, 2007.

(Continued)

*Primary Examiner*—Timothy C Vanoy
(74) *Attorney, Agent, or Firm*—Kalow & Springut; William D. Schmidt

(57) ABSTRACT

A nitrogen oxide storage catalytic converter which is operated for a relatively long time at low exhaust-gas temperatures in the range between 120 and 250° C. exhibits a decreasing storage capacity as a result of incomplete regeneration at said temperatures. In order to re-establish the original storage capacity of the catalytic converter which is operated in this way, two-stage regeneration is proposed, wherein the storage catalytic converter is initially partially regenerated at the low exhaust gas temperature by means of a switch from the lean mode to the rich mode, and wherein subsequently, with rich exhaust gas again, the exhaust-gas temperature of the engine is raised into a range of between 300 and 400° C. for complete regeneration.

4 Claims, 2 Drawing Sheets

FOREIGN PATENT DOCUMENTS

| | | |
|---|---|---|
| DE | 10103771 A1 | 8/2002 |
| JP | 07166851 | 6/1995 |
| JP | 07 166851 A | 6/2005 |

OTHER PUBLICATIONS

Written Opinion (PCT/EP2006/0101109), date unknown.

Notification of Transmittal of Translation of the International Preliminary Report on Patentability (PCT/EP2006/010109), dated May 22, 2008.

* cited by examiner

METHOD FOR OPERATING A NITROGEN OXIDE STORAGE CATALYST IN A DIESEL ENGINE

FIELD OF THE INVENTION

The present invention relates to a method for operating a nitrogen oxide storage catalytic converter which is arranged in the exhaust system of a diesel engine.

BACKGROUND OF THE INVENTION

Diesel engines are operated with highly superstoichiometric air/fuel mixtures. Their exhaust gas contains a correspondingly high proportion of oxygen of approximately 3 to 15% by volume. As pollutants, diesel engines emit nitrogen oxides (NOx), carbon monoxide (CO) and hydrocarbons (HC) and soot. In comparison with gasoline engines, their emissions of nitrogen oxides are low, but in order to meet legal emissions limit values, it is necessary to further reduce even these low concentrations by means of exhaust-gas aftertreatment.

On account of the high oxygen content of the diesel exhaust gas, the nitrogen oxides contained therein cannot, as in the case of stoichiometrically operated spark-ignition engines, be continuously reduced by means of three-way catalytic converters with the simultaneous oxidation of hydrocarbons and carbon monoxide to form nitrogen. So-called nitrogen oxide storage catalytic converters have therefore been developed in order to remove the nitrogen oxides from the lean exhaust gas of said engines, which nitrogen oxide storage catalytic converters store the nitrogen oxides contained in the lean exhaust gas in the form of nitrates.

The mode of operation of nitrogen oxide storage catalytic converters is described in detail in the SAE document SAE 950809. Nitrogen oxide storage catalytic converters are accordingly composed of a catalyst material which is usually applied in the form of a coating on an inert honeycomb body composed of ceramic or metal, a so-called carrier body. The catalyst material contains the nitrogen oxide storage material and a catalytically active component. The nitrogen oxide storage material is in turn composed of the actual nitrogen oxide storage component which is deposited on a support material in highly disperse form. As storage components, use is made predominantly of the basic oxides of the alkali metals, the earth alkali metals and the rare earth metals, but in particular barium oxide, which react with the nitrogen dioxide to form the corresponding nitrates.

As catalytically active components, use is usually made of the noble metals of the platinum group, which are deposited generally together with the storage component on the support material. As support material, use is made predominantly of active, high-surface-area aluminium oxide. The catalytically active components can however also be applied to a separate support material such as for example active aluminium oxide.

The task of the catalytically active components is to convert carbon monoxide and hydrocarbons in the lean exhaust gas into carbon dioxide and water. Said catalytically active components also catalyze the oxidation of nitrogen monoxide to form nitrogen dioxide, which reacts with the basic storage materials to form nitrates (storage phase or lean operation). Nitrogen monoxide does not form nitrates with the storage materials. Said nitrogen monoxide is contained in the exhaust gas of diesel engines in proportions of 65 to 95% depending on the operating conditions of the engine.

With increasing accumulation of the nitrogen oxides into the storage material, the remaining storage capacity of the storage material decreases, and said storage material must therefore be regenerated from time to time. For this purpose, the engine is operated for a short time with rich air/fuel mixtures (so-called regeneration phase or rich operation). Under the reducing conditions in the rich exhaust gas, the nitrates are broken down to form nitrogen oxides (NOx) and, using carbon monoxide, hydrogen and hydrocarbons as reducing agents, are reduced to form nitrogen with the formation of water and carbon dioxide.

During operation of the nitrogen oxide storage catalytic converter, the storage phase and regeneration phase alternate regularly. On account of the relatively low nitrogen oxide concentration in the exhaust gas, the storage phase usually lasts between 1 and 10 minutes, while the regeneration phase ends even in less than 20 seconds. In order to determine the optimum switching time from the storage phase to the regeneration phase, it is for example possible for a nitrogen oxide sensor to be arranged downstream of the storage catalytic converter. If the nitrogen oxide concentration in the exhaust gas measured by said sensor rises above a previously defined threshold value, then the regeneration of the catalytic converter is initiated. The threshold value is generally selected from the interval between 30 and 100, preferably between 30 and 60, vol.-ppm.

Modern nitrogen oxide storage catalytic converters have a working range of between approximately 150 and 500° C. Below 150° C., effective storage of the nitrogen oxides no longer takes place on account of the decreasing speed of the oxidation from nitrogen monoxide to nitrogen dioxide with decreasing temperature and on account of the slowed solid state reactions in the catalytic converter. Above 500° C., the nitrogen oxides which are stored as nitrates are no longer stable and are released into the exhaust gas as nitrogen oxides. The optimum operating range of a nitrogen oxide storage catalytic converter is approximately between 300 and 400° C. This applies both to the storage of the nitrogen oxides in the lean exhaust gas and also to the regeneration of the storage catalytic converter in the rich exhaust gas.

One peculiarity of the diesel exhaust gas is its low temperature. In part-load operation of the engine, the exhaust-gas temperature is usually between 120 and 250° C. Only at full load can it occasionally rise up to 500° C. It is therefore often the case that the exhaust gas of the diesel engine is between 120 and 250° C. during longer operating phases in city driving. In this case, one notices that an upcoming regeneration of the storage catalytic converter does not take place completely, but rather that a certain proportion of the nitrogen oxides remains on the storage catalytic converter. The storage capacity of said storage catalytic converter for nitrogen oxides is thus reduced.

The reduced storage capacity naturally leads to shortened storage phases. After the regeneration and the switch to lean operation, the threshold value of the nitrogen oxide concentration downstream of the catalytic converter for the initiation of the next regeneration is exceeded more quickly than in the case of a fully-regenerated storage catalytic converter.

If the exhaust-gas temperature is increased before the start of the regeneration in order to regenerate the storage catalytic converter as completely as possible at the increased exhaust-gas temperature, then during the temperature increase, an early emission of nitrogen oxides occurs which cannot be converted. In addition, during the storage phase, undesired nitrogen oxide emissions are observed during brief temperature increases as a result of thermal desorption of nitrogen oxides. Said undesired emissions reduce the attainable nitrogen oxide conversion.

SUMMARY OF THE INVENTION

It was therefore an object of the present invention to specify a method for operating a nitrogen oxide storage catalytic converter on a diesel engine, by means of which method said undesired emissions can be largely reduced.

Said object is achieved by means of a method as per the claims. In said method, the nitrogen oxide storage catalytic converter in the exhaust-gas purification system of a diesel engine is operated with alternating storage and regeneration phases, with the catalytic converter storing the nitrogen oxides contained in the exhaust gas during operation of the engine with a lean air/fuel mixture, and with the catalytic converter being regenerated by operating the engine with a rich air/fuel mixture when the nitrogen oxide concentration downstream of the catalytic converter rises above a limit value. The method is characterized in that, during operating phases at exhaust-gas temperatures of between 120 and 250° C., the storage catalytic converter is regenerated in the usual way periodically by enriching the exhaust gas while the exhaust gas temperature remains the same, and in that, from time to time, directly after a regeneration of said type, in a second regeneration step, the exhaust-gas temperature is additionally raised, for complete regeneration of the storage catalytic converter, into a range of between 300 and 400° C., and therefore also the firmly bonded nitrates are desorbed and converted.

DETAILED DESCRIPTION OF THE PREFERRED EMBODIMENTS

According to the invention, therefore, the problem of complete regeneration of a storage catalytic converter which is operated at low exhaust-gas temperatures without early emissions of nitrogen oxides is solved in that a two-stage regeneration is carried out from time to time. The first stage of said regeneration corresponds to a conventional regeneration, that is to say the engine is switched from the lean mode into the rich mode while the exhaust gas temperature remains the same. During said regeneration step, loosely bonded nitrogen oxides are desorbed and converted. In order to convert the firmly bonded nitrogen oxides too, after said conventional regeneration step, the exhaust-gas temperature is raised into the range between 300 and 400° C. by means of corresponding engine measures while the exhaust gas remains at the same level of richness. At said exhaust-gas temperature, the firmly bonded nitrogen oxides are also desorbed and converted at the catalytic converter. The engine is then switched back to the lean mode.

The two-stage regeneration needs not be carried out at every regeneration event. It has proven to be sufficient if a two-stage regeneration is carried out only after every $3^{rd}$ to $10^{th}$ conventional regeneration. Alternatively, the duration of the lean phases can be taken into consideration as a measure for the decrease in the storage capacity as a result of incomplete regeneration at low exhaust-gas temperatures. As already explained above, the diesel engine is preferably switched from the lean mode into the rich mode when the nitrogen oxide concentration in the exhaust gas downstream of the storage catalytic converter exceeds a predefined limit value. This leads to the duration of the lean phases being shortened with decreasing storage capacity. If the value for the duration of the storage phases falls below a predefined value, the two-stage regeneration is initiated. The predefined value for the duration of the storage phases for the initiation of the two-stage regeneration is preferably 40 to 70% of the duration of the storage phases for the fully-regenerated storage catalytic converter.

The stepped regeneration according to the invention makes it possible to fully regenerate the storage catalytic converter after a long phase with low exhaust-gas temperature without sudden and intense desorption of the nitrogen oxides.

Figure 1:
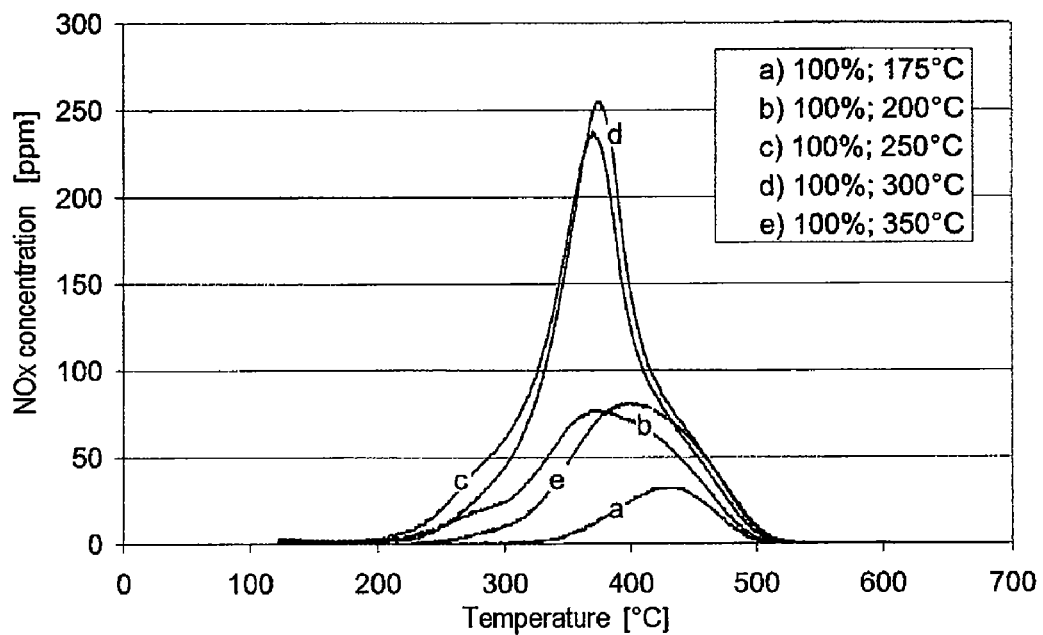
FIG. 1 shows the measurement of the thermal desorption from a storage catalytic converter after it has, at different temperatures, been loaded with NO until the complete breakthrough of NO.

The invention is now explained in more detail on the basis of the following tests. In the figures:

FIG. 1 shows the measurement of the thermal desorption from a storage catalytic converter after it has, at different temperatures, been loaded with NO until the complete breakthrough of NO.

Figure 2:
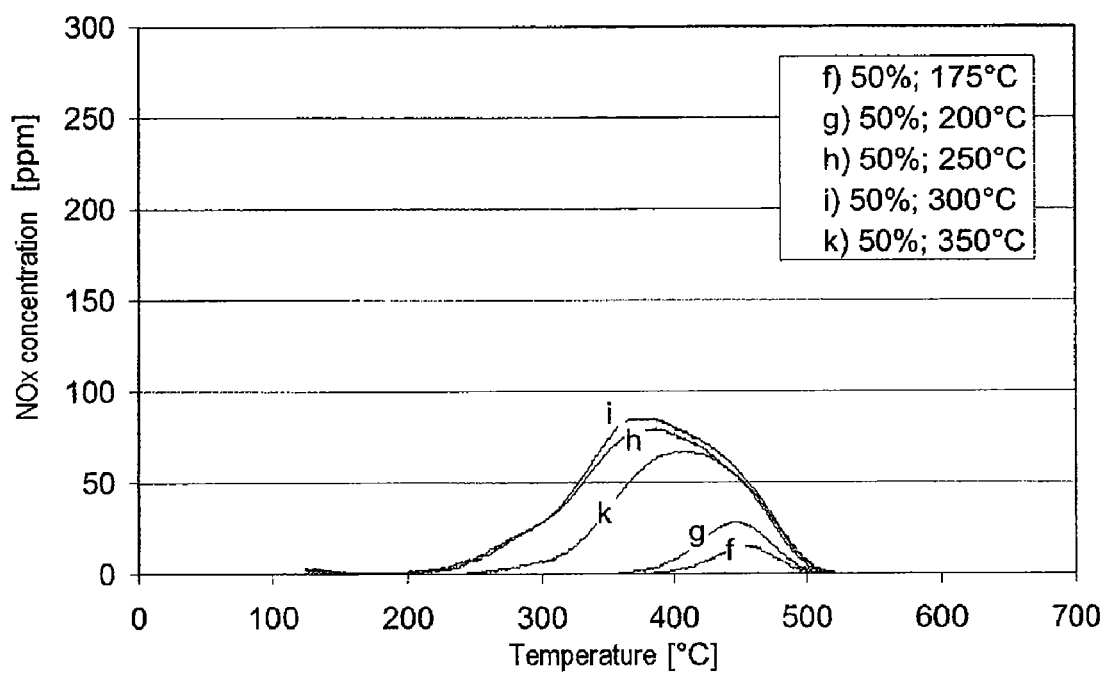
FIG. 2 shows the measurement of the thermal desorption from a storage catalytic converter after it has, at different temperatures, been loaded with NO until the 50% breakthrough of NO.

FIG. 2 shows the measurement of the thermal desorption from a storage catalytic converter after it has, at different temperatures, been loaded with NO until the 50% breakthrough of NO.

Figure 3:
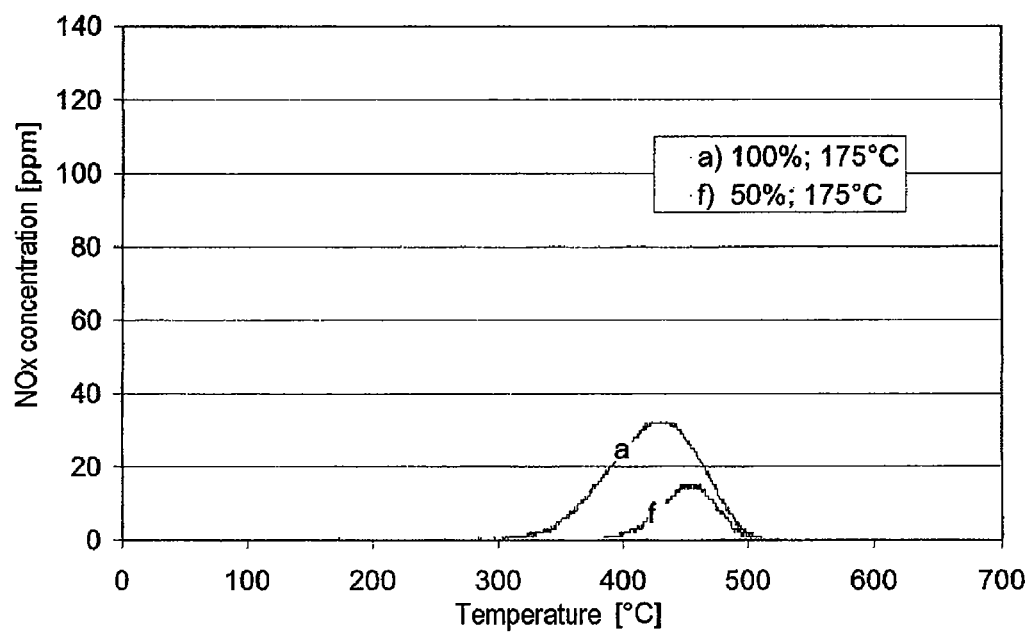
FIG. 3 shows a comparison of the thermal desorption from a storage catalytic converter after loading at 175° C. until the complete breakthrough of NO and until the 50% breakthrough of NO respectively.

FIG. 3 shows a comparison of the thermal desorption from a storage catalytic converter after loading at 175° C. until the complete breakthrough of NO and until the 50% breakthrough of NO respectively.

Figure 4:
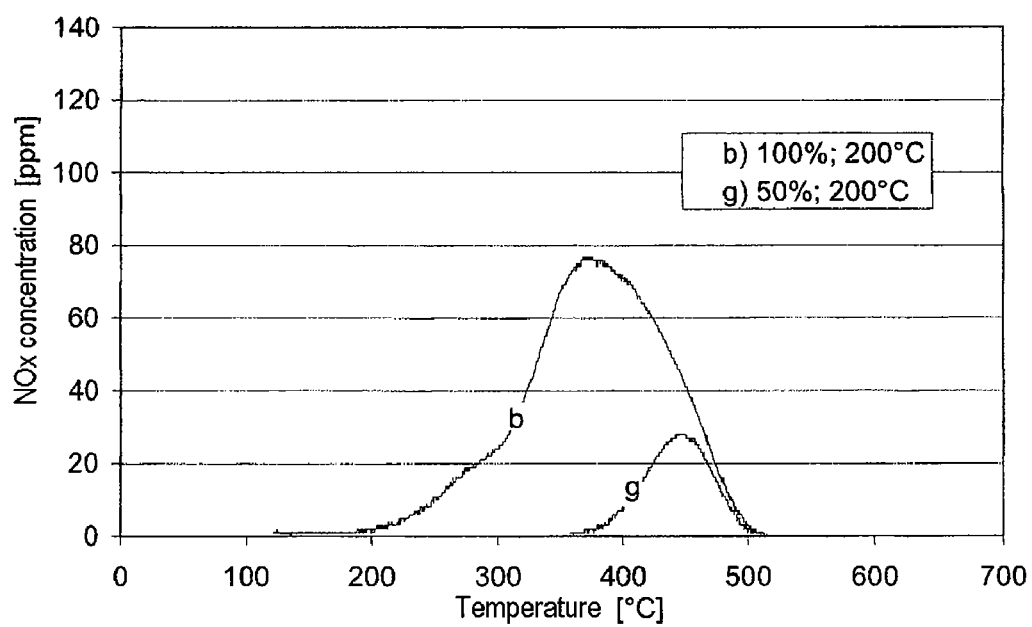
FIG. 4 shows a comparison of the thermal desorption from a storage catalytic converter after loading at 200° C. until the complete breakthrough of NO and until the 50% breakthrough of NO respectively.

FIG. 4 shows a comparison of the thermal desorption from a storage catalytic converter after loading at 200° C. until the complete breakthrough of NO and until the 50% breakthrough of NO respectively.

FIGS. 1 to 4 show a series of thermal desorption curves of a nitrogen oxide storage catalytic converter after the loading of the catalytic converter with nitrogen oxides by acting on said catalytic converter with a model exhaust gas which has a concentration of 350 ppm nitrogen monoxide. The nitrogen oxide storage catalytic converter contains barium oxide for the storage of the nitrogen oxides and aluminium oxide, which is activated with platinum and rhodium, for the oxidation of nitrogen monoxide to form nitrogen dioxide during the lean phase (storage phase) and for the reduction of the released nitrogen oxides during the regeneration phase.

The loading of the catalytic converter took place at different exhaust-gas temperatures (adsorption temperatures). A model gas having the exhaust-gas constituents listed in the table below served as exhaust gas for simulating lean operation and rich operation of the engine.

The catalytic converter was firstly conditioned in rich exhaust gas at a space velocity (GHSV) of 50 000 $h^{-1}$ for a duration of 30 minutes at 550° C. A switch was then made to lean exhaust gas and the catalytic converter was cooled. After reaching the desired adsorption temperature, 350 vol.-ppm (volume-ppm) of NO was supplied to the lean exhaust gas. At the start of each loading process, the concentration of nitrogen monoxide measurable downstream of the catalytic converter was practically zero on account of the good storage capacity of the catalytic converter. With increasing loading, the nitrogen oxide concentration downstream of the catalytic converter rose slowly. The loading was continued until 50 and 100% respectively of the NO concentration supplied to the catalytic converter was measurable downstream of the catalytic converter.

The catalytic converter was then cooled, under lean conditions, in each case to a start temperature for the desorption measurements of 100° C. The desorption of the nitrogen oxides, that is to say the nitrogen oxide concentration downstream of the catalytic converter, was then measured under lean conditions as a function of the model gas temperature, which was for this purpose raised at a rate of 10° C./min.

TABLE

| | model gas composition | | |
|---|---|---|---|
| Model gas component | | Lean exhaust gas $\lambda = 1.66$ | Rich exhaust gas $\lambda = 0.85$ |
| CO | [vol. %] | 0.035 | 4.5 |
| $H_2$ | [vol. %] | 0.0116 | 1.5 |
| $O_2$ | [vol. %] | 10 | 0.44 |
| $C_3H_8$ | [Vppm] | 0 | 0 |
| $C_3H_6$ | [Vppm] | 150 | 4000 |
| NO adsorption | [Vppm] | 350 | 0 |
| $CO_2$ | [vol. %] | 10 | 10 |
| Water | [vol. %] | 10 | 10 |
| $N_2$ | | Rest | Rest |
| GHSV | $[h^{-1}]$ | 50 000 | 50 000 |
| T | [° C.] | 100-600 | 550 |
| Temperature ramp | [° C./min] | 10 | |

In a first series of tests, the loading was continued until the concentration downstream of the catalytic converter was equal to the input concentration (100%).

Said state corresponded to complete loading of the catalytic converter until saturation with nitrogen oxides.

The measured desorption curves are shown in FIG. 1. It is possible to see from the height of the desorption maxima that the storage capacity rises with increasing temperature, reaches its maximum approximately at a temperature of 300° C. (curve d) and decreases again thereafter as a result of thermal desorption (curve e, exhaust-gas temperature 350° C.).

In a second series of tests, the loading was ended after the attainment of a nitrogen oxide concentration downstream of the catalytic converter of 50% of the input concentration. The associated desorption curves are shown in FIG. 2. Said measurements show, in principle, the same dependency of the storage capacity on the temperature.

In FIGS. 3 and 4, the curves from FIGS. 1 and 2 for a loading temperature of 175° C. (FIG. 3, measurement curves a and f) and 200° C. (FIG. 4, measurement curves b and g) respectively are compared with one another.

FIGS. 3 and 4 show an interesting property of the desorption curves. While their right flank is independent of the exhaust-gas temperature during loading, the start of the desorption (left flank of the desorption curves) moves to higher temperatures under only partial loading of the catalytic converter.

It can be seen that, at higher loading of the nitrogen oxide storage catalytic converter, a large part of the stored nitrogen oxides is bonded very loosely and is thermally desorbed already at relatively low temperatures of between 200 and 300° C. In order to prevent said desorption, according to the invention, said loosely bonded proportions are initially regenerated without a temperature increase of the exhaust gas by switching into the rich mode. Only thereafter is the exhaust-gas temperature increased and the more firmly-bonded proportion of the nitrogen oxides also regenerated.

What is claimed is:

1. Method for operating a nitrogen oxide storage catalytic converter in the exhaust-gas purification system of a diesel engine with alternating storage and regeneration phases, with the catalytic converter storing the nitrogen oxides contained in the exhaust gas during operation of the engine with a lean air/fuel mixture, and with the catalytic converter being regenerated by operating the engine with a rich air/fuel mixture when the nitrogen oxide concentration downstream of the catalytic converter rises above a limit value, characterized in that, during operating phases at exhaust-gas temperatures of between 120° C. and 250° C., the storage catalytic converter is regenerated in the usual way periodically by enriching the exhaust gas while the exhaust gas temperature remains the same, and in that, from time to time, directly after a regeneration of said type, in a second regeneration step, the exhaust-gas temperature is additionally raised, for complete regeneration of the storage catalytic converter, into a range of between 300° C. and 400° C., and therefore also the firmly bonded nitrates are desorbed and converted.

2. Method according to claim 1, characterized in that the second regeneration step is initiated after every $3^{rd}$ to $10^{th}$ regeneration.

3. Method according to claim 1, characterized in that the second regeneration step is initiated if the duration of the storage phases falls below a predefined value.

4. Method according to claim 3, characterized in that the predefined value for the duration of the storage phases for the initiation of the second regeneration step is 40% to 70% of the duration of the storage phases for the fully-regenerated storage catalytic converter.

* * * * *